United States Patent [19]
Trefiak

[11] Patent Number: 5,452,538
[45] Date of Patent: Sep. 26, 1995

[54] FISH HOOK PROTECTOR

[76] Inventor: Terry Trefiak, P.O. Box 187, Bawlf, Alberta, Canada, T0B-0J0

[21] Appl. No.: 170,760

[22] Filed: Dec. 21, 1993

[51] Int. Cl.⁶ .................................................. A01K 87/00
[52] U.S. Cl. .................................................. 43/25.2
[58] Field of Search .................................. 43/25.2, 42.4, 43/43.2, 43.4, 43.6, 42.1, 4

[56] References Cited

U.S. PATENT DOCUMENTS

| | | | |
|---|---|---|---|
| 3,418,742 | 12/1968 | Yaklyvich | 43/25.2 |
| 3,722,128 | 3/1973 | Tremblay | 43/42.4 |
| 4,771,564 | 9/1988 | Whitley | 43/4 |
| 5,056,256 | 10/1991 | Truax | 43/25.2 |
| 5,220,742 | 6/1993 | Lewis | 43/25.2 |

*Primary Examiner*—Kurt Rowan

[57] ABSTRACT

A fish hook protector for at least partially encasing a fishing hook to prevent accidental engagement with the hook. The protector includes a cylindrical side wall having a top wall extending across the top end of the side wall. The top wall has a center aperture for receiving a shank of the hook and a channel extends through both the side wall and the top wall to facilitate an insertion of the hook when the same is attached to a line. The top wall further has an eccentric aperture positioned proximate the side wall and another channel connecting the eccentric aperture to the center aperture. The channels are colinearly arranged and allow the protector to be biased apart along the channel to be placed over a hook. Alternate embodiments of the present invention include a cap for enclosing the hook within the protector, clips for attaching the protector to a fishing pole, and an oil-saturated foam liner for applying a rust preventative oil to the associated hook.

6 Claims, 4 Drawing Sheets

FIG. 1-A 5,452,538

FISH HOOK PROTECTOR

BACKGROUND OF THE INVENTION

1. Field of the Invention

The present invention relates to protectors and more particularly pertains to a fish hook protector for at least partially encasing a fishing hook to prevent accidental engagement with the hook.

2. Description of the Prior Art

The use of protectors is known in the prior art. More specifically, protectors heretofore devised and utilized for the purpose of shielding a fishing hook are known to consist basically of familiar, expected and obvious structural configurations, notwithstanding the myriad of designs encompassed by the crowded prior art which have been developed for the fulfillment of countless objectives and requirements.

For example, a fish hook guard is illustrated in U.S. Pat. No. 5,123,199 which encloses and shields the sharp barb portion of a fish hook. The enclosure consists of a base portion with a radially extending slot which extends from the outer edge of the base portion to a location immediately past a center point in the base portion and a corresponding cover portion which has openings for drainage of moisture from the fish hook guard. The base portion and the cover portion are preferably pivotally connected together and either may include at least one vertically extending projection which assists in orienting the fish hook within the fish hook guard.

A fish hook protector is described in U.S. Pat. No. 4,597,216 which includes a plate-like center part having opposite side edges which are parallel, an elongated gripping part which extends along one of the opposite sides and has an elongated channel for gripping leg portion of the fish hook, and an elongated shielding part which extends along the other of the opposite sides and has an elongated channel for covering at least the sides of a curved portion of the fish hook whose leg portion is received in the elongated gripping part.

Another patent of interest is U.S. Pat. No. 4,667,433 which discloses a fish hook safety device for safely and securely holding a hook whether such hook is a single or gang hook while the hook is attached to a fishing line or stored in a tackle box. The device has a sloping interior surface such that the barbed and pointed ends of a hook rest on the sloping surface. The device is operable to accommodate a variety of hooks of different sizes and shapes.

While these devices fulfill their respective, particular objectives and requirements, the aforementioned patents do not describe a fish hook protector of unitary construction which includes a cylindrical side wall having a top wall extending across the top end of the side wall, and a channel extending through both the side wall and the top wall which allow the protector to be biased apart along the channel and placed over a hook when such hook is attached to a fishing line. Furthermore, none of the known prior art protectors teach or suggest a fish hook protector including a cap for enclosing the hook within the protector, clips for attaching the protector to a fishing pole, and an oil-saturated foam liner for applying a rust-preventative oil to the associated hook.

In these respects, the fish hook protector according to the present invention substantially departs from the conventional concepts and designs of the prior art, and in so doing provides an apparatus primarily developed for the purpose of at least partially encasing a fishing hook to prevent accidental engagement with the hook.

SUMMARY OF THE INVENTION

In view of the foregoing disadvantages inherent in the known types of protector now present in the prior art, the present invention provides a new fish hook protector construction wherein the same can be utilized for at least partially encasing a fishing hook to prevent accidental engagement with the hook. As such, the general purpose of the present invention, which will be described subsequently in greater detail, is to provide a new fish hook protector apparatus which has many of the advantages of the protector mentioned heretofore and many novel features that result in a fish hook protector which is not anticipated, rendered obvious, suggested, or even implied by any of the prior art protector, either alone or in any combination thereof.

To attain this, the present invention essentially comprises a fish hook protector for at least partially encasing a fishing hook to prevent accidental engagement with the hook. The protector includes a cylindrical side wall having a top wall extending across the top end of the side wall. The top wall has a center aperture for receiving a shank of the hook and a channel extends through both the side wall and the top wall to facilitate an insertion of the hook when the same is attached to a line. The top wall further has an eccentric aperture positioned proximate the side wall and another channel connecting the eccentric aperture to the center aperture. The channels are colinearly arranged and allow the protector to be biased apart along the channels to be placed over a hook. Alternate embodiments of the present invention include a cap for enclosing the hook within the protector, clips for attaching the protector to a fishing pole, and an oil-saturated foam liner for applying a rust preventative oil to the associated hook.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish hook protector apparatus which has many of the advantages of the protector mentioned heretofore and many novel features that result in a fish hook protector which is not anticipated, rendered obvious, suggested, or even implied by any of the prior art protectors, either alone or in any combination thereof.

It is another object of the present invention to provide a new fish hook protector which may be easily and efficiently manufactured and marketed.

It is a further object of the present invention to provide a new fish hook protector which is of a durable and reliable construction.

An even further object of the present invention is to provide a new fish hook protector which is susceptible of a low cost of manufacture with regard to both materials and labor, and which accordingly is then susceptible of low prices of sale to the consuming public, thereby making such fish hook protector economically available to the buying public.

Still yet another object of the present invention is to provide a new fish hook protector which provides in the apparatuses and methods of the prior art some of the advantages thereof, while simultaneously overcoming some of the disadvantages normally associated therewith.

Still another object of the present invention is to provide a new fish hook protector for at least partially encasing a fishing hook to prevent accidentally engagement with the hook.

Yet another object of the present invention is to provide a new fish hook protector which includes a cylindrical side wall having a top wall extending across the top end of the side wall and a channel extending through both the side wall and the top wall which allows the protector to be bias apart along the channel to be placed over a hook when the same is attached to a line.

Even still another object of the present invention is to provide a new fish hook protector which further includes a cap for enclosing the hook within the protector, clips for attaching the protector to a fishing pole and a oil-saturated foam liner for applying a rust-preventative oil to the associated hook.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1A is a perspective view of the hook and related components in an enlarged showing to illustrate more clearly the constructions thereof.

DESCRIPTION OF THE PREFERRED EMBODIMENT

Figure 1:
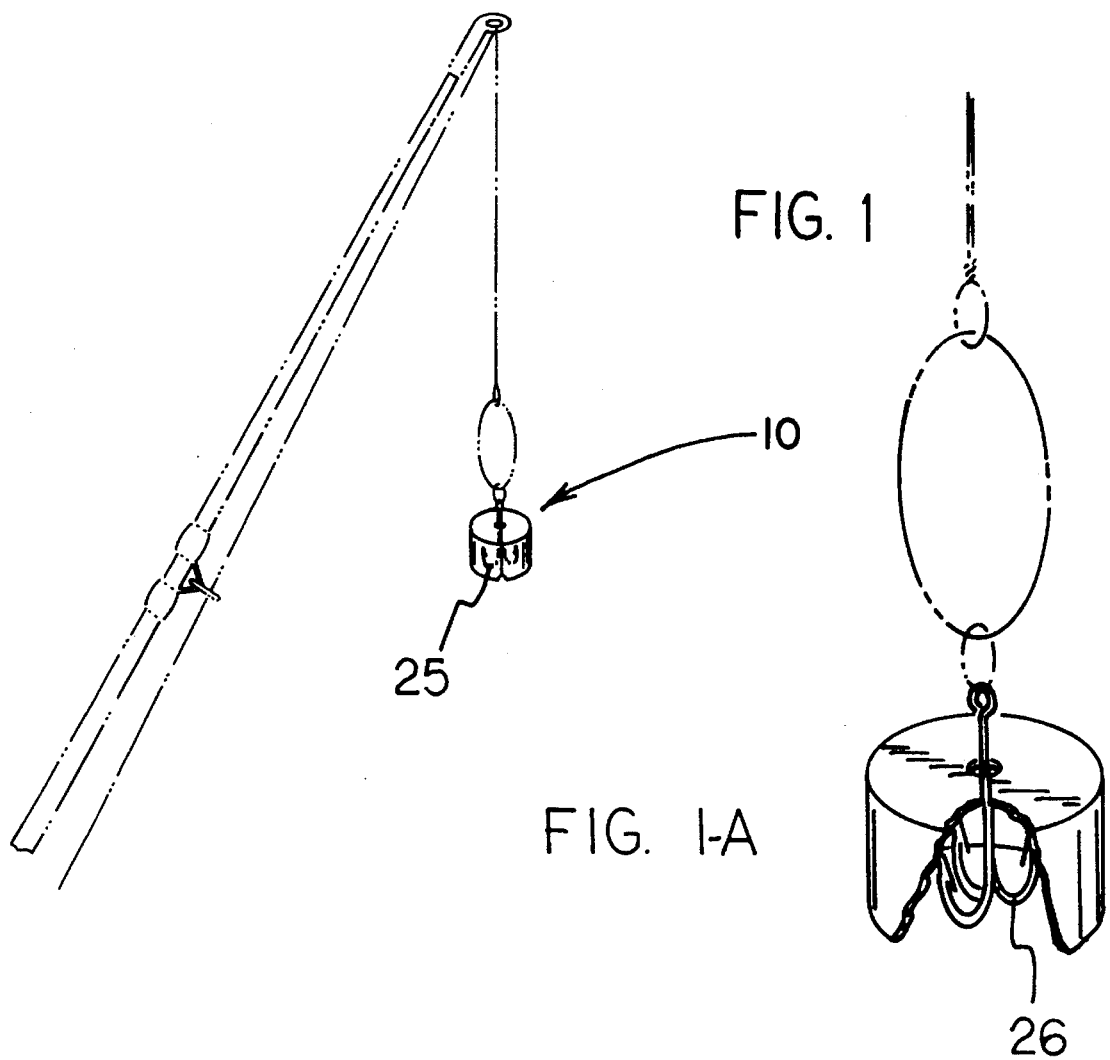
FIG. 1 is a perspective view of a first embodiment of a fish hook protector comprising the present invention as installed upon a hook.
Figure 2:
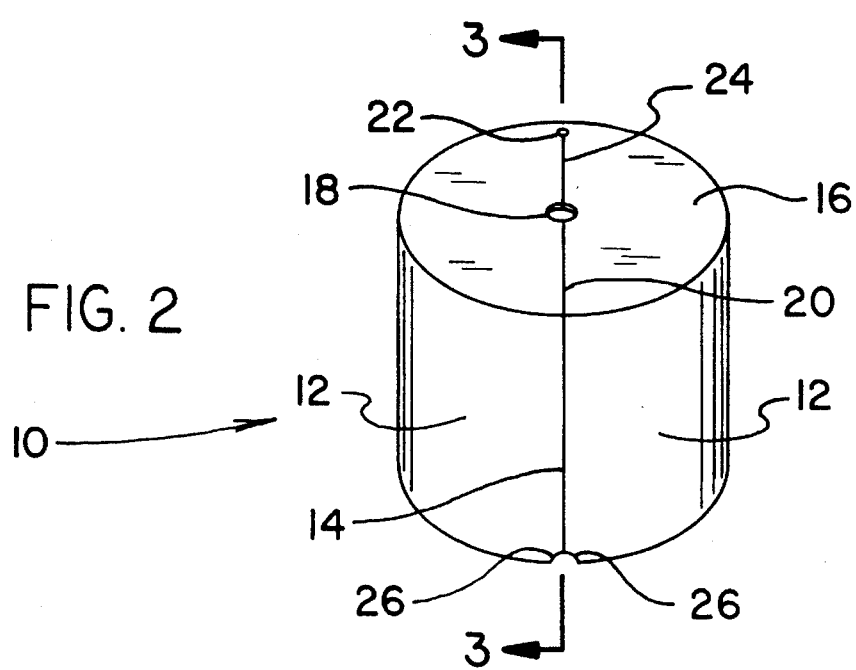
FIG. 2 is a further perspective view of the present invention.

With reference now to the drawings, and in particular to FIGS. 1–6 thereof, a first embodiment of a new fish hook protector embodying the principles and concepts of the present invention and generally designated by the reference numeral 10 will be described.

From an overview standpoint, the fish hook protector 10 comprises a substantially cylindrically shaped side wall 12 having a longitudinally extending side wall channel 14. A substantially circular top wall 16 is integrally or otherwise connected to a top end of the cylindrical side wall 12 and extends thereacross. The top wall 16 is shaped in such a manner so as to define a center aperture 18 and an outer top wall channel 20 which extends from the center aperture to the side wall channel 14. In addition, the top wall 16 further defines an eccentric aperture 22 positioned proximate the side wall 12 and an inner top wall channel 24 which extends between the eccentric aperture and the center aperture 18.

The top wall channels 20, 24 are colinearly arranged and lie in the same plane as the side wall channel 14. Such arrangement allows the protector 10 to be biased apart along the channels 14, 20, 24 and placed over a hook 25, whereby an unlabeled shank of the hook can extend through the center aperture 18 of the top wall 16.

In use, the protector 10 may be placed over a hook by a user who biases respectively opposed sides of the cylindrical side wall 12 apart along the channels 14, 20, 24, to allow the hook 25 to be positioned laterally into the protector, whereby the side wall 12 will resiliently surround the hook 25 while allowing the shank of the hook to extend through the center aperture 18 of the top wall 16. The fish hook protector 10 effectively prevents accidental engagement with the barbs of the hook and is particularly useful for enclosing grapple or treble hooks.

More specifically, it will be noted that the fish hook protector 10 comprises a substantially cylindrically shaped side wall 12 formed of any substantially resilient material such as a plastic or the like. The side wall 12 includes a substantially longitudinally extending side wall channel 14 and a pair of notched portions 26 located proximate the bottom end of the channel which cooperate to guide a hook 25 into the side wall channel 14.

A substantially circular top wall 16 is integrally or otherwise fixedly secured to a top end of the cylindrical side wall 12 and extends thereacross. The top wall 16 is shaped in such a manner so as to define a center aperture 18 and an outer top wall channel 20 which extends between the center aperture and the side wall channel 14. The top wall 16 further defines an eccentric aperture 22 positioned proximate the side wall 12 and an inter top wall channel 24 which extends between the eccentric aperture and the center aperture 18.

The top wall channels 20, 24 are colinearly arranged and also lie in the same plane as the side wall channel 14 such that the protector 10 may be biased apart along the channels and placed over the hook 25. Alternatively, the notched portions 26 allow the hook. 25 to be slid through the channels 14, 20 into a position where the shank extends through the center aperture 18 of the top wall 16.

Figure 3:
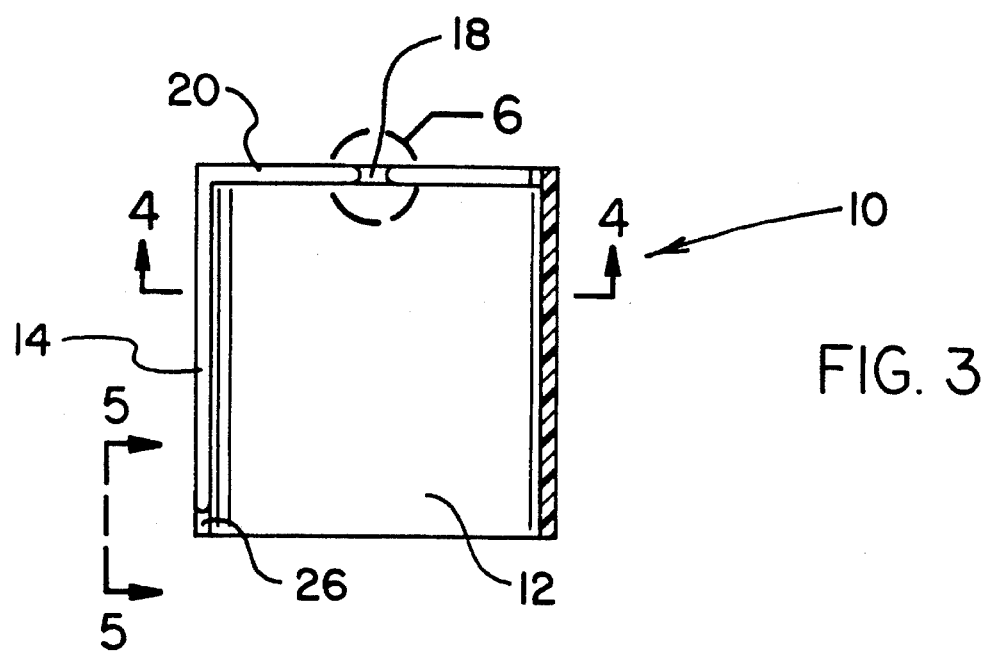
FIG. 3 is a cross sectional view taken along line 3—3 of FIG. 2.
Figure 4:
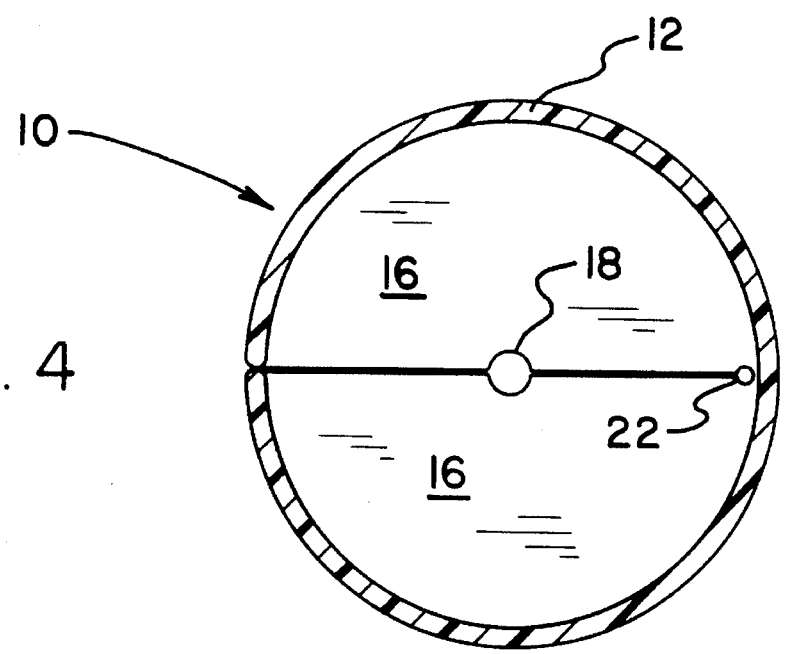
FIG. 4 is a cross sectional view of the fish hook protector taken along line 4–4 of FIG. 3.

FIG. 3 is a cross sectional view of the protector 10 and it can be seen from this Figure that the side wall 12 terminates at respectively opposed sides of the side wall channel 14 to define a substantially closed C-shape.

Figure 5:
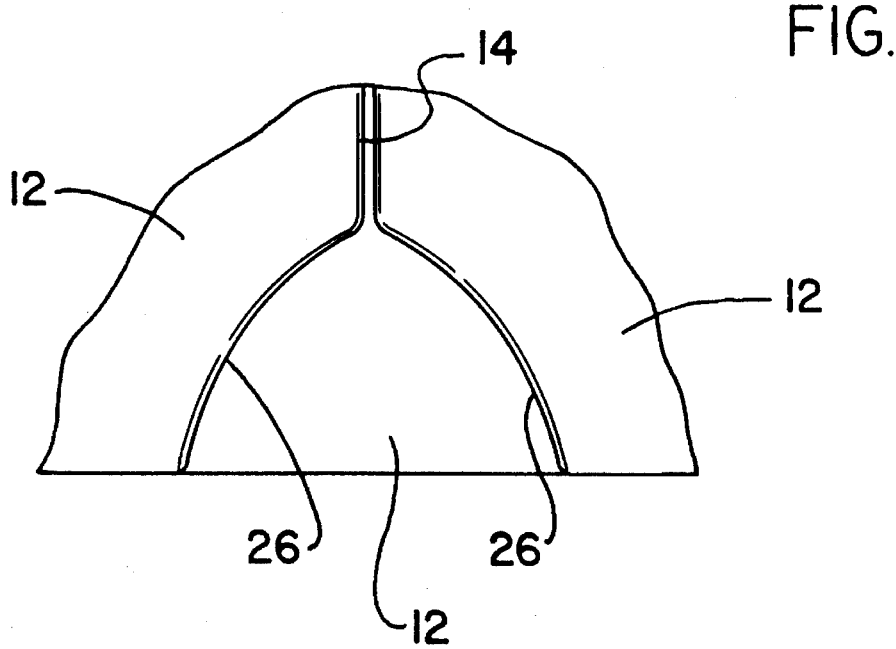
FIG. 5 is an enlarged side elevation view of a portion of the invention as viewed from line 5–5 of FIG. 3.
Figure 6:
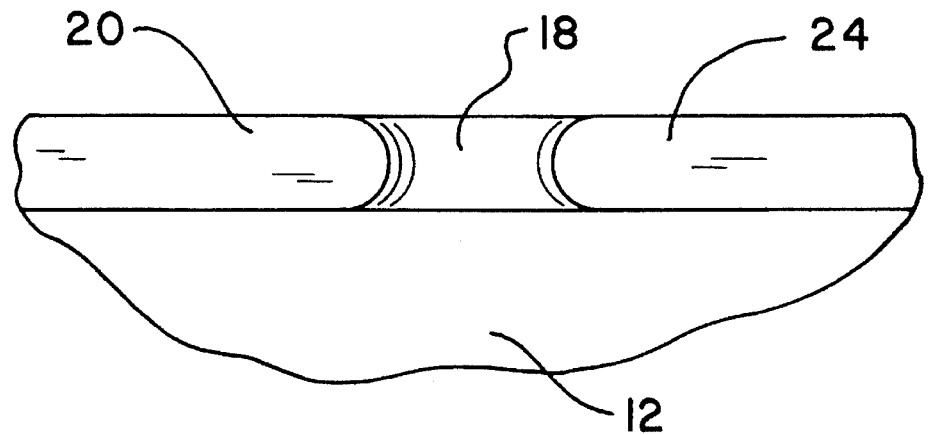
FIG. 6 is an enlarged side elevation view of the circled area of FIG. 3.

The notched portions 25 of the side wall 12 are most clearly illustrated in the enlarged view shown in FIG. 5. The notched portions 26 are substantially concave in shape and are operable to receive and guide the shank of the fish hook 16 into the side wall channel 14. Because the notched portions 26 are located so as to guide the shank of the hook 26 into the side wall channel 14, slipping and fumbling of the fish hook protector 10 during its installation onto the hook 26 is greatly reduced.

In use, the protector 10 may be placed over a hook by a user who biases respectively opposed sides of the cylindrical side wall 12 apart along the channels 14, 20, 24, to allow the hook 25 to be positioned laterally into the protector, whereby the side wall 12 will resiliently surround the hook 25 while allowing the shank of the hook to extend through the center aperture 18 of the top wall 16. The fish hook protector 10 effectively prevents accidental engagement with the barbs of the hook and is particularly useful for enclosing grapple or treble hooks.

Figure 7:
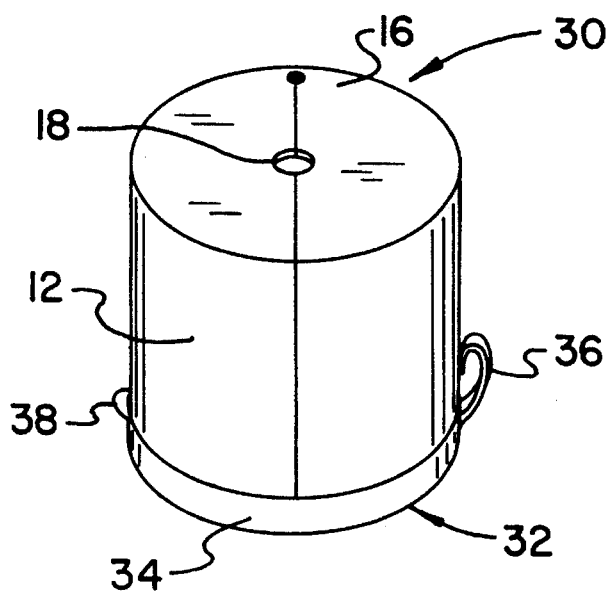
FIG. 7 is a perspective view of a second embodiment of a fish hook protector comprising the present invention.
Figure 8:
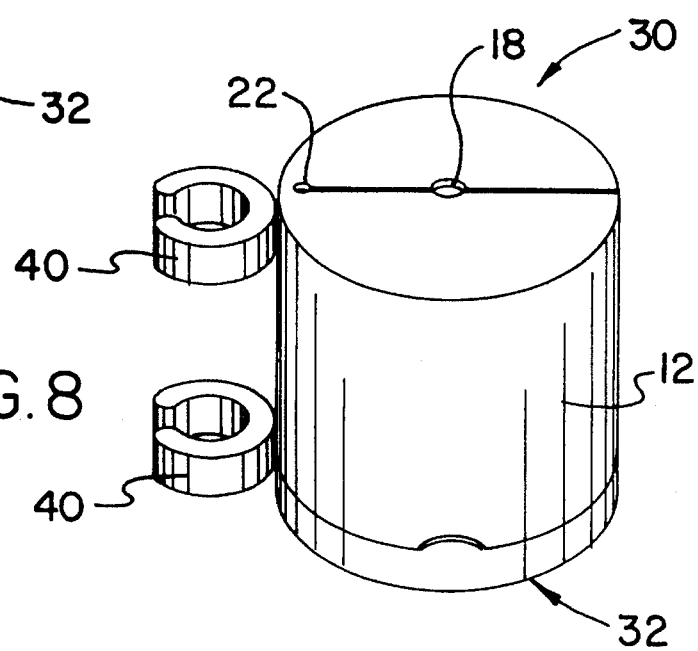
FIG. 8 is a further perspective view of the second embodiment.

A second embodiment of the present invention, as generally designated by the reference numeral 30, which comprises substantially all of the features and structure of the foregoing embodiment 10 and which further comprises a closure assembly will now be described. As best shown in FIGS. 7–8, it can be shown that the enclosure assembly 32 comprises a substantially cylindrically shaped cap 34 which is coupled to the side wall 12 of the protector 30 by a tether 36 which effectively precludes a loss of the cap.

The cap 34 includes an annular groove along an inner periphery thereof which is cooperatively engagable to an annular projection along the bottom edge of the side wall 12. Thusly, the cap 34 may be snapped onto the side wall 12 to effectively enclose the hook 25 within the protector 30. The cap 34 precludes a biasing apart of the side wall 12 along the channel 14 and such cap is provided with a tab 38 which selectively permits an easy and well understood removal thereof.

Additionally or alternatively, the second embodiment 30 may also include a pair of clips 40 which facilitate an attachment of the fish hook protector 30 to a fishing pole. The clips 40 are coupled to the side wall 12 by conventional fasteners or alternatively, the clips 40 may be integrally molded with the side wall.

Figure 9:
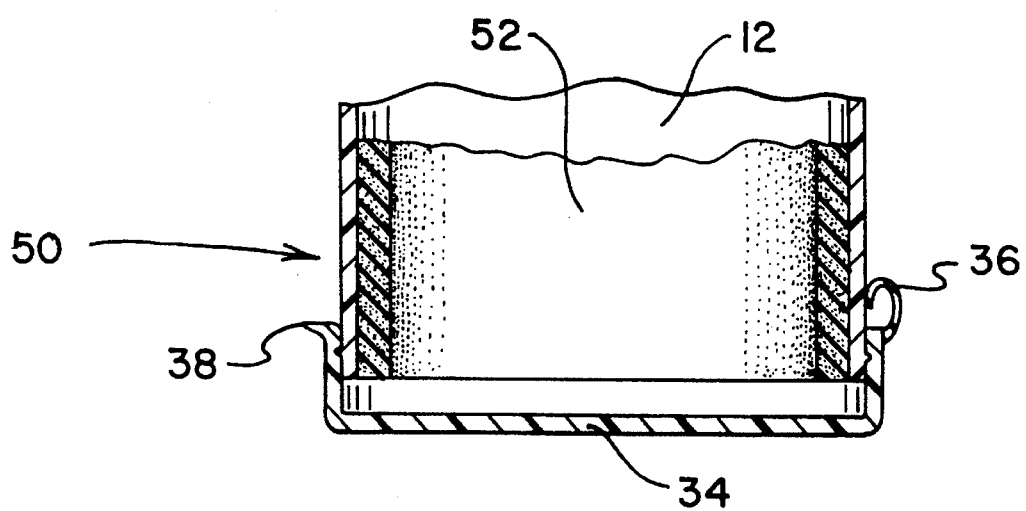
FIG. 9 is an enlarged cross sectional view of a portion of a third embodiment of a fish hook protector comprising the present invention.

Comprising substantially all of the features and structure of the previous embodiments 10, 30 is a third embodiment which is generally designated by the reference numeral 50 and may be viewed in FIG. 9. With reference to this Figure and concurrent reference to the Figures previously discussed, it can be shown that the third embodiment 50 further comprises an oil-saturated foam liner 52 disposed concentrically along the interior of the side wall 12. The foam liner 52 prevents a rattling of the hook 25 within the protector 50 and is further operable to retain a rust-preventative oil which may be applied to the hook to effectively prevent corrosion of the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish hook protector comprising:

a substantially cylindrically-shaped side wall having a top end, a bottom end, and a longitudinally extending side wall channel extending from said top end to said bottom end thereof, said side wall channel being substantially straight and extending completely through said side wall, said side wall being shaped so as to define a pair of similarly shaped notched portions positioned proximate said bottom end and said side wall channel; and, a substantially circular top wall orthogonally coupled to said top end of said side wall to extend thereacross, said top wall having a circular center aperture extending through a center of said top wall, said top wall further having an outer top wall channel extending from said circular center aperture to intersect with said side wall channel, said top wall still further having a circular eccentric aperture extending through said top wall and positioned proximate said side wall, said top wall still yet further having an inner top wall channel extending from said circular eccentric aperture to said circular center aperture, wherein said side wall channel, said outer top wall channel, and said inner top wall channel lie in a common plane, and further wherein said side wall and said top wall are integrally formed of a resiliently deformable material such that said side wall and said top wall can be resiliently biased apart along said channels and placed over a hook, whereby a shank of the hook can extend through said circular center aperture of said top wall to center said hook within said protector, with said circular eccentric aperture being operable to reduce stressing of said resiliently deformable material to preclude stress-induced fracturing of said material during resilient deformation of the protector separating said channels along both said side wall and said top wall, and still further wherein a diameter of said circular center aperture is substantially greater than a transverse width of said inner top wall channel, said outer top wall channel, and said side wall channel such that said shank is releasably captured within said circular center aperture after placement thereinto, whereby said protector is relasably coupled to said hook such that all of said hook except for said shank is positioned within said side wall with a barb of said hook engaging an interior surface of said top wall to preclude a passage of said hook through said circular center aperture.

2. The new fish hook protector of claim 1, and further comprising a closure means for enclosing said bottom end of said side wall.

3. The new fish hook protector of claim 2, wherein said closure means comprises a cap having an annular groove extending around an inner periphery thereof; an annular projection extending around said side wall and releasably engaged to said annular groove; a tether coupled to said cap and said side wall, and a tab coupled to a portion of said cap for facilitating a separation of said cap from said side wall.

4. The new fish hook protector of claim 3, and further comprising at least one clip means for coupling said protector to a fishing pole.

5. The new fish hook protector of claim 4, and further comprising a foam liner extending at least partially around an interior of said side wall.

6. The new fish hook protector of claim 5, wherein said foam liner is an oil-absorbent foam liner.

* * * * *